United States Patent [19]

Cirelli et al.

[11] Patent Number: 5,500,916
[45] Date of Patent: Mar. 19, 1996

[54] METHOD FOR MAKING BRAGG REFLECTORS FOR WAVEGUIDES

[75] Inventors: Raymond A. Cirelli, Hillsborough; Charles H. Henry, Skillman; Edward J. Laskowski, Scotch Plains, all of N.J.; Michele A. Milbrodt, Macungie, Pa.; Henry H. Yaffe, Dunwoody, Ga.

[73] Assignee: AT&T Corp., Murray Hill, N.J.

[21] Appl. No.: 303,913

[22] Filed: Sep. 9, 1994

[51] Int. Cl.⁶ .............................. G02B 6/34; H01L 21/70
[52] U.S. Cl. ................... 385/37; 385/14; 385/27; 385/130; 385/131; 437/51
[58] Field of Search .................. 385/14, 15, 27, 385/31, 37, 129, 130, 131; 437/51, 36, 37

[56] References Cited

U.S. PATENT DOCUMENTS

| | | | |
|---|---|---|---|
| 3,884,549 | 5/1975 | Wang et al. | 385/37 X |
| 4,464,762 | 8/1984 | Furuya | 385/131 X |
| 4,729,641 | 3/1988 | Matsuoka et al. | 385/37 X |
| 5,157,537 | 10/1992 | Rosenblatt | 385/37 X |
| 5,195,161 | 3/1993 | Adar et al. | 385/129 |
| 5,208,882 | 5/1993 | Strasser et al. | 385/37 |
| 5,210,404 | 5/1993 | Cush et al. | 385/37 X |
| 5,309,260 | 5/1994 | Mizrahi et al. | 385/37 X |
| 5,367,588 | 11/1994 | Hill et al. | 385/37 |

OTHER PUBLICATIONS

R. Adar, et al. "Wide-band Bragg reflectors made with silica on silicon waveguides", *Appl. Phys. Lett.* No. 60, pp. 1924–1926 (1992) (no month).

*Primary Examiner*—Brian Healy
*Attorney, Agent, or Firm*—Glen E. Books

[57] ABSTRACT

A waveguide Bragg reflector is made by forming periodic grooves in either the undercladding or the core, applying a high index coating on the grooved surface and selectively removing the coating from the horizontal surfaces while leaving the coating on the vertical surfaces. The waveguide is then completed.

9 Claims, 2 Drawing Sheets

METHOD FOR MAKING BRAGG REFLECTORS FOR WAVEGUIDES

FIELD OF THE INVENTION

This invention relates to methods for making optical devices and in particular, to a method for making Bragg reflectors for waveguides. The method is particularly useful for making broadband Bragg reflectors for silica waveguides.

BACKGROUND OF THE INVENTION

Optical devices composed of planar optical waveguides in various configurations have much promise for optical communications systems. Silica waveguides, for example, have been configured into a variety of passive integrated optical circuits, and additional components have been added to make hybrid integrated circuits. An advantage of planar waveguides over fiber devices is that photolithography can be used to make a number of identical devices and circuits in a single processing sequence, much as electronic integrated circuits are made.

Bragg reflector filters are useful in a variety of integrated optical circuits, including drop filters and wavelength division multiplexers and demultiplexers. A typical Bragg filter comprises a length of optical waveguide having periodic perturbations in its index of refraction along its length to reflect light having a wavelength of twice the perturbation spacing. The perturbations can take the form of physical notches in the waveguide, its cladding, or both or can be photoinduced in the guiding material.

A difficulty in the fabrication of Bragg reflector filters arises because of the fine feature size required for wavelengths of interest for optical communication. Desired feature size of perturbations (~0.25 micrometer) requires either a state-of-the-art deep-UV stepper for photolithography or advanced non-lithographic processes such as holography or e-beam writing. The former approach uses exceedingly expensive equipment and the latter approaches forfeit the advantage of parallel processing inherent in photolithography. Accordingly, there is a need for an improved process for fabricating Bragg reflectors.

SUMMARY OF THE INVENTION

A waveguide Bragg reflector is made by forming periodic grooves in either the undercladding or the core, applying a high index coating on the grooved surface and selectively removing the coating from the horizontal surfaces while leaving the coating on the vertical surfaces. The waveguide is then completed.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
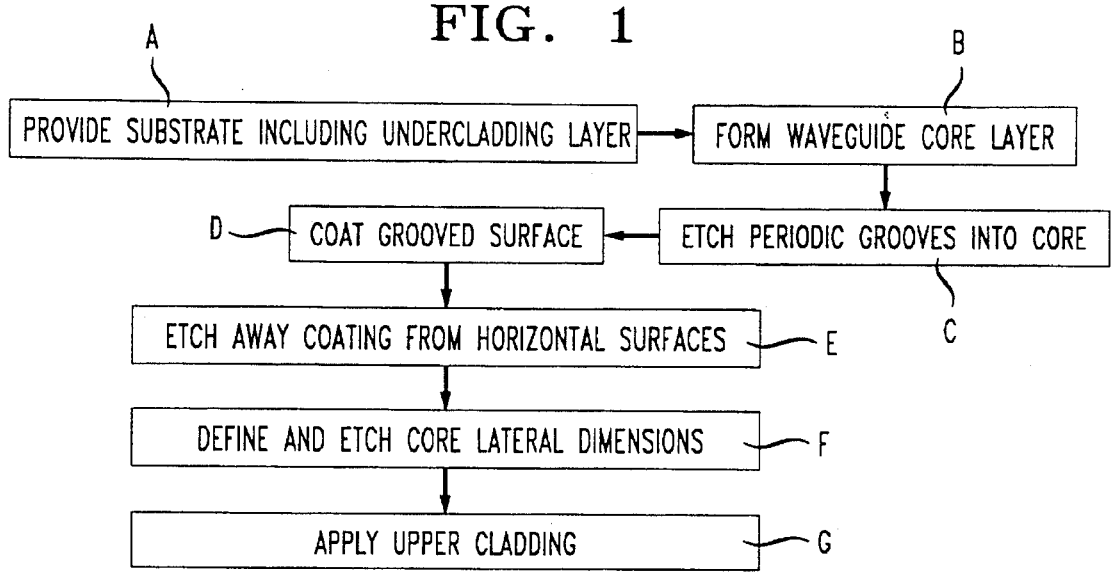
FIG. 1 is a block diagram of the steps in a preferred method of making a waveguide Bragg reflector.
Figure 2:
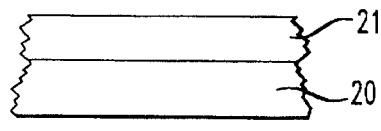
FIGS. 2–7 schematically illustrate a waveguide Bragg reflector at various stages of fabrication.

Referring to the drawings, FIG. 1 is a schematic block diagram of a preferred method for making a waveguide Bragg reflector. The first step shown in block A of FIG. 1 is to provide a substrate including an undercladding layer. The corresponding structure is schematically illustrated in FIG. 2 where the substrate 20 can be, for example, silicon or silica and the undercladding 21 is preferably silicon dioxide. The oxide undercladding is preferably formed by oxidation of the silicon, flame hydrolysis or low pressure chemical vapor deposition (LPCVD). Typical undercladding thicknesses are in the range 15–30 micrometers.

Figure 3:
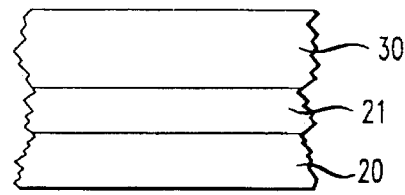

The next step, shown in block B of FIG. 1, is to deposit the waveguide core layer. The core is preferably silica doped with phosphorus or germanium to increase its index of refraction. The index of the core should be higher than the index of the undercladding. FIG. 3 illustrates the addition of the core layer 30 on an underclad substrate. Preferred thickness of the core layer is in the range 3–9 micrometers.

Figure 4:
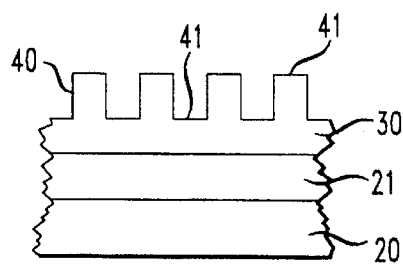

Block C of FIG. 1 shows the third step which involves forming periodic grooves in the core. The grooves have horizontal surfaces extending parallel to the waveguide core layer and vertical surfaces perpendicular to the core layer. The grooves are exposed photolithographically and etched, preferably using ion-assisted plasma etching to make substantially vertical walls. FIG. 4 illustrates grooves formed in the core layer 30 with vertical walls 40 and horizontal bases 41. The depth of etching is preferably in the range 0.25–1.0 micrometers. The periodic grooves form a corrugated grating with the etched corrugation period which is twice the desired final Bragg reflection period. The duty factor defined by the ratio of ridge width to the period of the corrugation is advantageously less than one.

Figure 5:
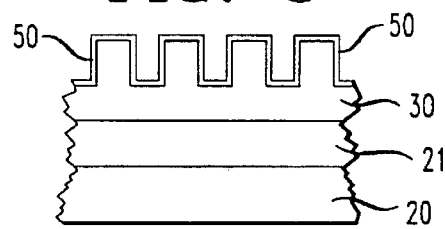

The next step shown in FIG. 1, block D, is to coat the grooved surface with a conforming layer of high refractive index material having a thickness less than 25% of the groove width. The coating layer should have an index of refraction greater than the core and preferably in the range 1.8–2.5. Its thickness is advantageously less than 5% the groove width and preferably less than 1%. A preferred high index material is silicon nitride $Si_3N_4$ which can be applied in thin, conforming coats by LPCVD. FIG. 5 shows the resulting structure with high index coating 50 disposed over both the vertical walls 40 and the horizontal bases 41.

The next step shown in FIG. 1, block E, is to selectively remove the high index coating from the horizontal surfaces parallel to the core layer, while retaining the coating on the perpendicular vertical surfaces. This is advantageously accomplished by reactive ion etching.

Figure 6:
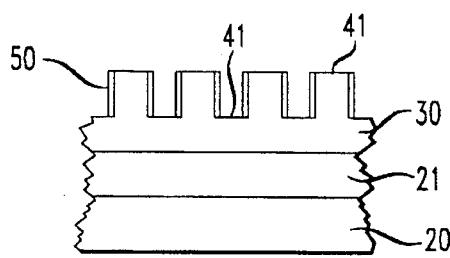

The resulting structure is shown in FIG. 6. This structure now comprises two Bragg reflectors, the first is a first order, high duty factor, high index Bragg reflector formed by the vertical sheets of the high index coating, and the second is the second order reflector formed between the oxide and the air. It is noteworthy that in the first reflector, the vertical sheets occur at twice the frequency of the grooves. Advantageously, the ridges, before coating, are slightly narrower than the troughs to account for the thickness of the coatings deposited on the walls.

As shown in Block F, the waveguide's lateral dimension is now conveniently defined as by photolithography and reactive ion etching. The resulting waveguide is thus defined in both dimensions transverse to light propagation and has the Bragg reflector on the top or bottom cladding interface.

Figure 7:
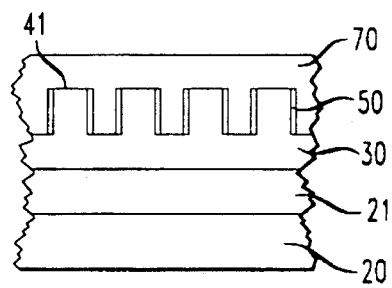

Block G of FIG. 1 shows the final step of applying an upper cladding to fill the troughs and passivate the structure. The cladding is preferably boron and phosphorus doped silicon oxide deposited by LPCVD. The outer cladding 70 is shown deposited in FIG. 7.

One advantage of this process is that a Bragg reflector in glass for 1.5 micrometer wavelength light can be made with half-micron resolution photolithography and filling. Half micron features can be controlled using more conventional technology without the necessity of the expense required for state-of-the-art 0.25 micron features.

Another advantage is that vertical sheets reflect TE and TM polarizations with the same strength and wavelength dependence, so that the Bragg reflectors of sheets are nearly polarization independent, despite the high refractive index of the sheet material.

Figure 8:
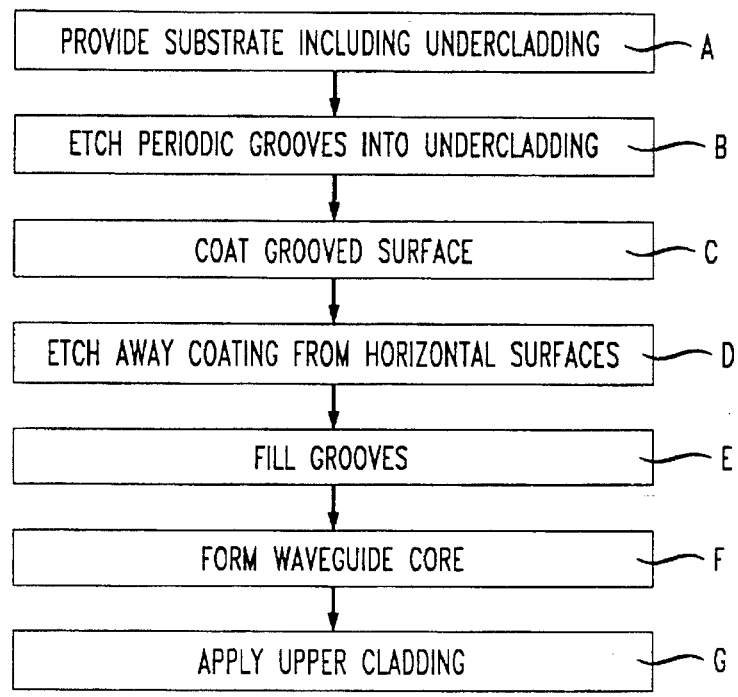
FIG. 8 illustrates an alternative form of the FIG. 1 process where the grooves are made in the undercladding rather than in the core.

Alternatively, grooves can be etched and coated in the lower cladding layer rather than in the core. FIG. 8 is a block diagram of the alternative process in which the first step (Block A) is provision of a substrate including an undercladding layer extending in the longitudinal direction of the waveguide to be formed. The second step in Block B is to etch the periodic grooves in the undercladding layer rather than the core layer. The next steps are to coat the grooved surface with a high index coating (Block C), to etch away the coating from the horizontal surfaces while retaining the coating on the vertical surfaces (Block D). The grooves are then filled with cladding material (Block E). The waveguide core layer can then be deposited over the filled grooves and defined in the lateral dimension (Block F), and the waveguide device can be finished in the conventional manner.

As a specific example, second order Bragg reflectors with upper cladding applied were exposed and etched 1 micron deep into a lower cladding undoped oxide layer. The grooved surface was then coated with 230 Å of $Si_3N_4$, and then vertically etched by reactive ion etching leaving $Si_3N_4$ coated sidewalls. The grating was then filed with boron and phosphorus doped silicon oxide (B:P:TEOS). A 3 micron phosphorus doped core layer was then deposited and the waveguide configuration was defined in a second photolithography step, leaving 2.7×5 micron cores. The entire structure was then finished with 8 microns of B:P:TEOS upper cladding. Under 1.55 micron wavelength illumination the device reflected identical modes for both TE and TM polarized light.

Figure 9:
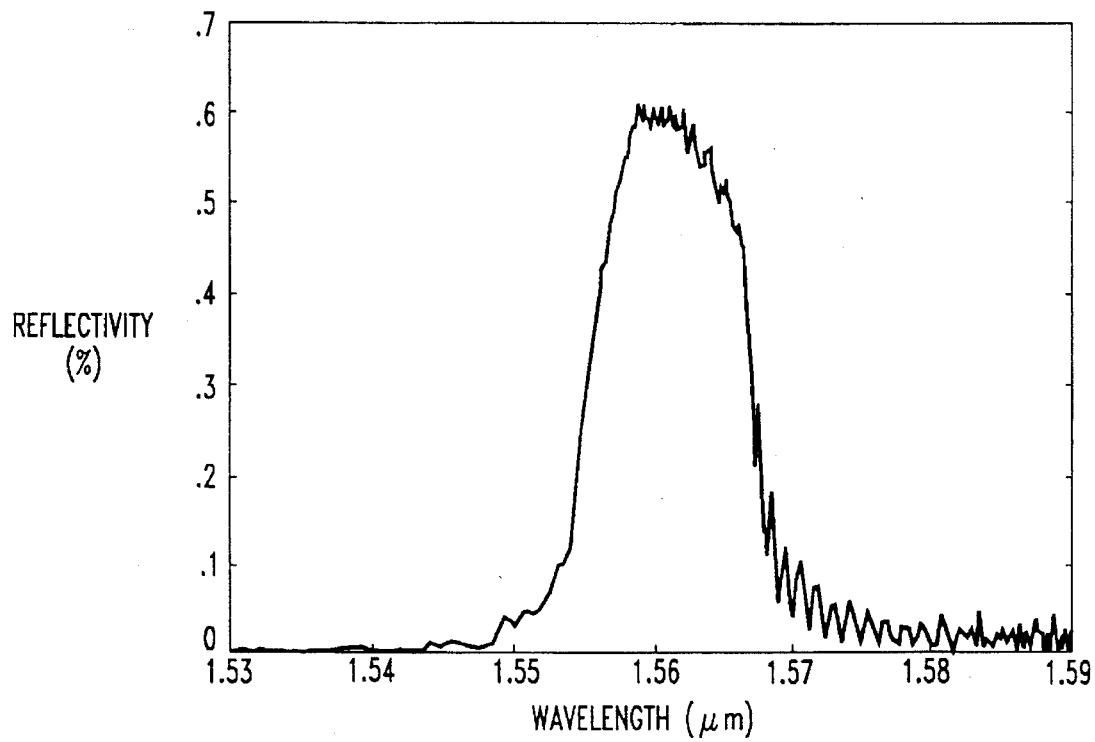
FIG. 9 graphically illustrates the transmission characteristics of a reflector made in accordance with the process of FIG. 8.

FIG. 9 shows spectral reflectivity measurements made on the device diced in the middle and butted to a fiber. The measured external reflectivity is only 50% due to coupling loss between the fundamental modes of the fiber and the device. However, the reflection passband is nearly flat across the top which corresponds to 100% internal reflectivity of the Bragg reflector. The 3 dB width of the reflector is 90 angstroms.

The processing method described herein thus yield uniform, polarization independent, moderately broadband reflective filters potentially useful in many passive optical applications. Processing of these devices requires only half micron photolithographic resolution.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

We claim:

1. In a method for making an optical waveguide Bragg reflector comprising the steps of providing a substrate including an undercladding layer, forming a waveguide core layer extending in a longitudinal direction, etching periodic grooves having parallel and perpendicular surfaces into the core and applying an outer cladding layer, the improvement wherein:

said perpendicular surfaces are selectively coated with a layer of material having a thickness less than 25% of the groove width and an index of refraction higher than the core material.

2. The improved method of claim 1 wherein said perpendicular surfaces are selectively coated by coating the grooved surfaces and selectively removing the coating from the parallel surfaces.

3. The improved method of claim 2 wherein said grooved surface is coated by low pressure chemical vapor deposition.

4. The improved method of claim 1 wherein said layer of material has a thickness of less than 5% the groove width.

5. The improved method of claim 1 wherein said material of said coated layer has an index of refraction in the range 1.8 to 2.5.

6. The improved method of claim 1 wherein said coated layer is silicon nitride.

7. In a method for making an optical waveguide Bragg reflector comprising the steps of providing a substrate including an undercladding layer extending in a longitudinal direction, etching periodic grooves having longitudinal and transverse surfaces into the undercladding, forming a waveguide core and applying an outer cladding layer, the improvement wherein:

said transverse surfaces are selectively coated with a layer of material having a thickness less than half the groove width and an index of refraction higher than the core material.

8. The improved method of claim 7 including the step of filling the coated grooves with additional cladding before forming said waveguide core.

9. The improved method of claim 8 wherein said layer of material has thickness of less than 5% the groove width and an index of refraction in the range 1.8 to 2.5.

* * * * *